(12) United States Patent
Jogand-Coulomb

(10) Patent No.: US 8,566,695 B2
(45) Date of Patent: Oct. 22, 2013

(54) CONTROLLING ACCESS TO DIGITAL CONTENT

(75) Inventor: Fabrice Jogand-Coulomb, San Carlos, CA (US)

(73) Assignee: Sandisk Technologies Inc., Plano, TX (US)

(*) Notice: Subject to any disclaimer, the term of this patent is extended or adjusted under 35 U.S.C. 154(b) by 1321 days.

(21) Appl. No.: 11/694,866

(22) Filed: Mar. 30, 2007

(65) Prior Publication Data

US 2008/0244713 A1    Oct. 2, 2008

(51) Int. Cl.
*G06F 17/00* (2006.01)

(52) U.S. Cl.
USPC .......................................... 715/204

(58) Field of Classification Search
USPC .......................................... 715/204
See application file for complete search history.

(56) References Cited

U.S. PATENT DOCUMENTS

| | | | |
|---|---|---|---|
| 6,189,033 B1 * | 2/2001 | Jin et al. ........................ | 709/225 |
| 6,230,203 B1 * | 5/2001 | Koperda et al. ............... | 709/229 |
| 6,310,857 B1 * | 10/2001 | Duffield et al. ............... | 370/232 |
| 6,990,502 B2 | 1/2006 | Waxman et al. | |
| 7,321,557 B1 | 1/2008 | Alvarez et al. | |
| 7,673,080 B1 * | 3/2010 | Yu et al. ........................ | 710/62 |
| 8,379,515 B1 | 2/2013 | Mukerji | |
| 2002/0051534 A1 * | 5/2002 | Matchett et al. ............... | 380/37 |
| 2002/0172153 A1 | 11/2002 | Vernon | |
| 2003/0079222 A1 * | 4/2003 | Boykin et al. ................. | 725/31 |
| 2003/0212837 A1 | 11/2003 | Tada | |
| 2003/0216824 A1 * | 11/2003 | Chu et al. ........................ | 700/94 |
| 2004/0028385 A1 | 2/2004 | Kori et al. | |
| 2004/0054864 A1 | 3/2004 | Jameson | |
| 2004/0086119 A1 * | 5/2004 | Moskowitz .................... | 380/205 |
| 2004/0098545 A1 * | 5/2004 | Pline et al. ..................... | 711/154 |
| 2004/0125952 A1 * | 7/2004 | Alattar et al. ................. | 380/202 |
| 2004/0133794 A1 * | 7/2004 | Kocher et al. ................. | 713/193 |
| 2004/0196972 A1 * | 10/2004 | Zhu et al. ........................ | 380/45 |
| 2004/0250065 A1 * | 12/2004 | Browning ...................... | 713/165 |
| 2004/0250092 A1 * | 12/2004 | Hori et al. ...................... | 713/189 |
| 2005/0025335 A1 * | 2/2005 | Bloom et al. ................... | 382/100 |
| 2005/0069133 A1 * | 3/2005 | Shimosato et al. ............ | 380/255 |
| 2005/0076136 A1 * | 4/2005 | Cho et al. ....................... | 709/231 |
| 2005/0100100 A1 | 5/2005 | Unger | |
| 2005/0119977 A1 | 6/2005 | Raciborski | |
| 2005/0182948 A1 * | 8/2005 | Ducharme ...................... | 713/189 |
| 2005/0210145 A1 * | 9/2005 | Kim et al. ....................... | 709/231 |
| 2005/0228906 A1 | 10/2005 | Kubota | |

(Continued)

FOREIGN PATENT DOCUMENTS

| | | |
|---|---|---|
| EP | 0715246 A | 6/1996 |
| EP | 1016948 A | 7/2000 |

(Continued)

OTHER PUBLICATIONS

Bonomi, The Rate-Based Flow Control Framework for the Available Bit Rate ATM Service, p. 25-39 (IEEE Network, Mar./Apr. 1995).*

(Continued)

*Primary Examiner* — Frank D Mills

(74) *Attorney, Agent, or Firm* — Toler Law Group, PC

(57) ABSTRACT

Method for utilizing digital content is provided. The method includes controlling a throughput rate for utilizing the digital content by an accessing system, wherein the throughput rate is associated with information related to the digital content stored as a file.

20 Claims, 6 Drawing Sheets

(56) References Cited

U.S. PATENT DOCUMENTS

| | | | |
|---|---|---|---|
| 2005/0235342 A1* | 10/2005 | Ene-Pietrosanu et al. | 726/6 |
| 2006/0005029 A1* | 1/2006 | Petrovic et al. | 713/176 |
| 2006/0010500 A1 | 1/2006 | Elazar et al. | |
| 2006/0015750 A1* | 1/2006 | Ashley et al. | 713/193 |
| 2006/0133428 A1 | 6/2006 | Guthrie et al. | |
| 2006/0239503 A1* | 10/2006 | Petrovic et al. | 382/100 |
| 2006/0242429 A1* | 10/2006 | Holtzman et al. | 713/189 |
| 2006/0259821 A1 | 11/2006 | Swoboda | |
| 2006/0265333 A1 | 11/2006 | Gomes et al. | |
| 2007/0030182 A1 | 2/2007 | Runze | |
| 2007/0033408 A1* | 2/2007 | Morten | 713/176 |
| 2007/0081587 A1* | 4/2007 | Raveendran et al. | 375/240.1 |
| 2007/0113290 A1* | 5/2007 | Charles et al. | 726/27 |
| 2007/0140647 A1 | 6/2007 | Kusunoki et al. | |
| 2007/0168321 A1* | 7/2007 | Saito et al. | 707/2 |
| 2007/0180539 A1* | 8/2007 | Holtzman et al. | 726/34 |
| 2007/0230700 A1* | 10/2007 | Dekker et al. | 380/241 |
| 2008/0019516 A1* | 1/2008 | Fransdonk | 380/201 |
| 2008/0043832 A1* | 2/2008 | Barkley et al. | 375/240 |
| 2008/0084896 A1 | 4/2008 | Fleury et al. | |
| 2008/0209550 A1* | 8/2008 | Di Iorio | 726/22 |
| 2009/0043906 A1* | 2/2009 | Hurst et al. | 709/231 |

FOREIGN PATENT DOCUMENTS

| | | | |
|---|---|---|---|
| EP | 1016948 A1 * | 7/2000 | |
| EP | 1465426 A1 | 10/2004 | |
| JP | 2004-038676 A | 2/2004 | |
| TW | 200704082 A | 1/2007 | |
| WO | 2004008457 A | 1/2004 | |
| WO | 2004008457 A2 | 1/2004 | |
| WO | 2006119169 A2 | 11/2006 | |

OTHER PUBLICATIONS

International Search Report and Written Opinion of the International Searching Authority for International Application No. PCT/US2008/058202, Mailed Jun. 24, 2008, 12 pp.

Examination Report for EP Application No. 08 744 359.4 dated Jan. 20, 2010, 4 pp.

Office Action issued Mar. 2, 2011 in Chinese Patent Application No. 200880004661.4 with English translation, 26 pages.

Second Office Action issued Feb. 29, 2012 in Chinese Application No. 200880004661.4 with English translation, 10 pages.

Communication Pursuant to Article 94(3) EPC issued Feb. 9, 2012 in European Application No. 08744359.4, 6 pages.

Extended European Search Report issued Feb. 10, 2012 in European Application No. 11194684.4, 7 pages.

Extended European Search Report issued Feb. 10, 2012 in European Application No. 11194701.6, 7 pages.

Office Action issued Jan. 13, 2012 in Taiwanese Application No. 097111552 with English translation, 10 pages.

Third Office Action issued Sep. 29, 2012 in Chinese Application No. 200880004661.4 with English translation, 36 pages.

Notification of Reasons for Refusal issued Jan. 22, 2013 in Japanese Application No. 2010-501177, with English translation, 8 pages.

Communication Pursuant to Article 94(3) EPC mailed Mar. 12, 2013 in European Application No. 11194684.4, 7 pages.

Communication Pursuant to Article 94(3) EPC mailed Mar. 21, 2013 in European Application No. 11194701.6, 7 pages.

Non-Final Office Action mailed Mar. 25, 2013 in U.S. Appl. No. 12/943,271, 18 pages.

Restriction Requirement mailed Feb. 20, 2013 in U.S. Appl. No. 12/943,213, 6 pages.

Restriction Requirement mailed Jul. 22, 2009 in U.S. Appl. No. 11/964,868, 6 pages.

Office Action issued Sep. 22, 2011 in Taiwanese Application No. 097111552, with English translation, 29 pages.

Fourth Office Action issued Apr. 19, 2013 in Chinese Application No. 200880004661.4, with English translation, 11 pages.

Office Action issued Mar. 26, 2013 in Taiwan Application No. 097111552, with English translation, 8 pages.

Notice of Allowance and Fee(s) Due mailed Jul. 8, 2013 in U.S. Appl. No. 12/943,271, 12 pages.

* cited by examiner

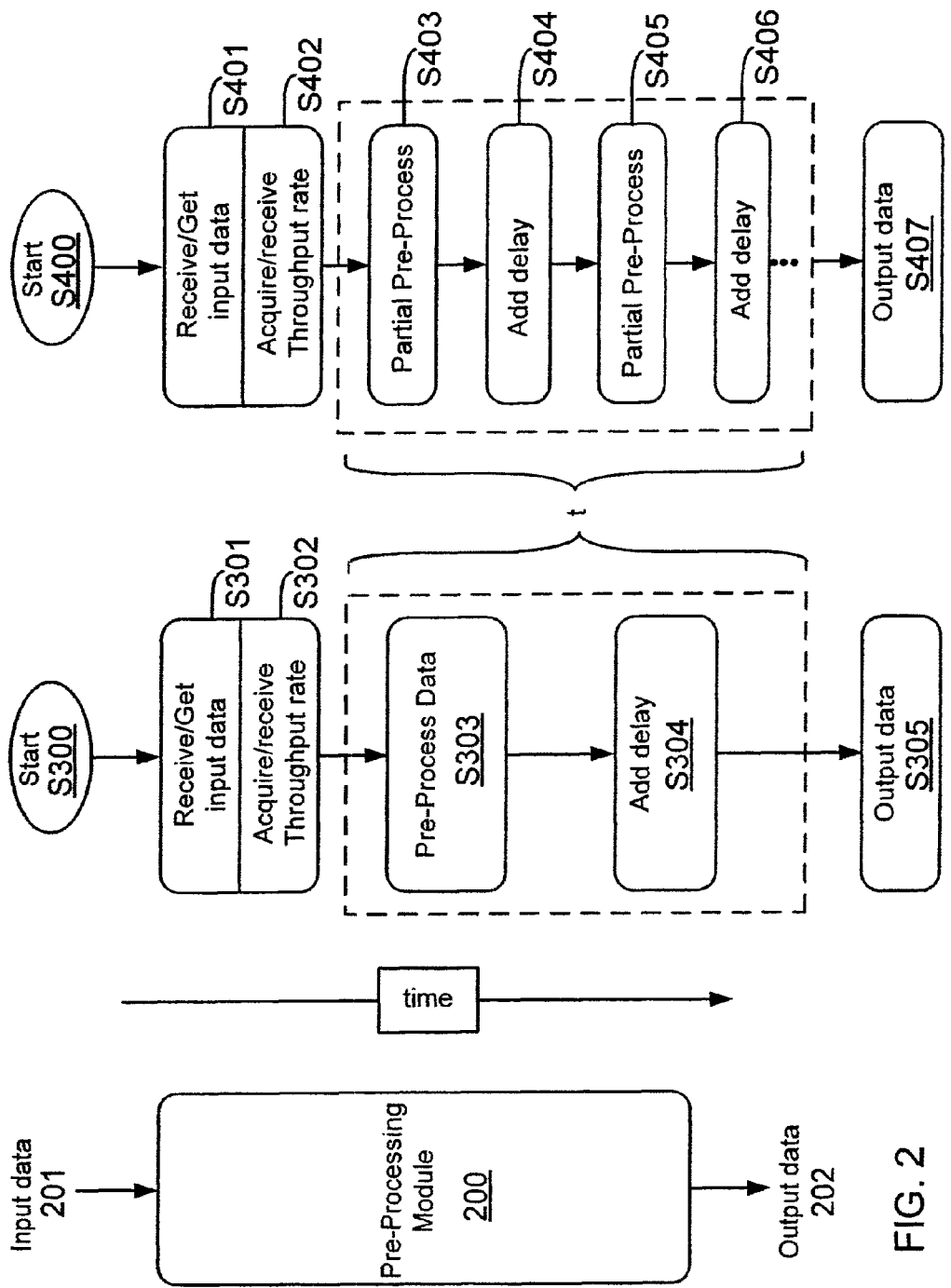

CONTROLLING ACCESS TO DIGITAL CONTENT

CROSS-REFERENCE TO RELATED APPLICATIONS

This patent application is related to U.S. patent application Ser. No. 11/694,868, entitled "SYSTEM FOR CONTROLLING ACCESS TO DIGITAL CONTENT", filed on even date herewith, the disclosure of which is incorporated herein by reference in its entirety.

BACKGROUND OF THE INVENTION

1. Field of the Invention

The present invention relates to digital content, and more particularly, to controlling access to digital content.

2. Background

Digital content (may also be referred to as data) is commonly used in today's computing environment. Digital content may be stored on a storage device (also referred to as storage system), or distributed via electronic communication such as the Internet, Peer-to-Peer software, electronic mail, and others. The Internet and other communication networks today enable various digital appliances and systems (may also be referred to as Accessing Systems) to interconnect and exchange digital content. Accessing Systems may include without limitation, personal computers, laptop computers, tablet computers, personal digital assistants (PDAs), mobile phones, MP3 players, DVD players, gaming consoles, digital recording devices such as digital cameras, and others.

Depending on the type of application, digital content is typically pre-processed prior to being utilized by an Accessing System. The term "pre-processing" (or "pre-processed") as used herein can include any operation that is used to enable or assist viewing, playing, listening to, reading, displaying, executing or accessing digital content. Some examples of pre-processing include compressing and de-compressing operations performed by a CODEC (compressor/de-compressor) module; decryption and encryption operations performed by a cryptographic module; and others. It is noteworthy that pre-processing as used herein does not depend on actual physical transfer of digital content from one location to another location.

Digital content is typically stored as an electronic file. A digital content file (may also be referred to as a "file") typically includes data that can be viewed, listened to, read, played, executed, or otherwise utilized by an end user using an appropriate application or device. A digital content file may include an audio file, a video file, a multi-media content file, a software file, an electronic book, a document, a computer game, a database, an application, or any other type of digital content. There are different file formats for storing digital content. For example, the MP3, Wav, REALAUDIO file format, and other file formats may be used to store audio files, while MP4, DIVX®, REALVIDEO file format, and other formats may be used for storing both audio and video files.

Typically, most digital content file formats may include a Bit Rate that is associated with the digital content. The Bit Rate is the data one needs to pre-process within a unit of time. The pre-processing depends on the file format and the type of operation. For example, to play an audio file, a certain amount of data is pre-processed to properly execute the audio file with minimal latency. If the audio file is an MP3 file it may have a Bit Rate of 128 kbps. This means that 128k bit of information is pre-processed for each second of encoded music. The Bit Rate may be fixed for a file, or may be variable. The Bit Rate may also correspond to the quality of encoding for some applications, typically, higher the Bit Rate, better the quality.

Different digital content files may have different Bit Rates. The difference in Bit Rates typically results in different file sizes. When digital content is utilized, the Accessing System (for example, a media player) needs data at a speed equal to or faster than the Bit Rate. Most Accessing Systems use a memory buffer (or storage space) to store content for uninterrupted processing, i.e. data is received from a storage system and then stored by the Accessing System in a memory buffer. When data is not received fast enough, then the Accessing Unit may have to interrupt processing (for example, playback) to buffer data.

Digital content may have some value to an entity, individual, business or a combination thereof. Hence, access to digital content may be limited to authorized applications, devices or a combination thereof, for enabling and safeguarding transactions involving digital content.

Digital Rights Management (DRM) may be used to protect digital content. DRM allows one to limit access to digital content by associating specific permissions to content. For example, a user may be prohibited from making a copy of, distributing, modifying, selling, or performing a copyrighted digital content file, without receiving proper permission from the copyright owner. Examples of copyrighted digital content include commercial movies, commercial music, electronic books, software, computer games, and the like. Different DRM standards may be used for different content types and formats and may provide different methods to distribute digital content and the associated permissions.

Memory devices such as memory cards, Smart cards, SIM (subscriber identity module) cards, embedded memory chips and others are becoming popular for storing digital content. Such devices have a maximum read and write speed that is determined by the underlying related technology such as the type of memory used (for example, NAND flash, NOR flash, EEPROM and others) or the type of memory controller. These memory devices can often release digital content to an Accessing System at a speed greater than a minimum speed at which the Accessing System needs access to the digital content for properly utilizing the digital content.

Digital content owners and providers seek to prevent digital content "piracy", i.e. unauthorized use and distribution of digital content. Digital content owners such as recording companies and movie studios have not been very successful in solving piracy related problems. Therefore, there is a need for a method and system to discourage piracy without affecting authorized distribution and use of digital content.

SUMMARY OF THE INVENTION

In one embodiment, a method for utilizing digital content is provided. The method includes controlling a throughput rate for utilizing the digital content by an accessing system, wherein the throughput rate is associated with information related to the digital content stored as a file.

In another embodiment, a method for utilizing digital content is provided. The method includes controlling a throughput rate for utilizing the digital content by an accessing system, wherein the throughput rate is associated with an access parameter that is used to control access to the digital content stored as a file.

In yet another embodiment, a method for utilizing digital content is provided. The method includes controlling a throughput rate for utilizing the digital content by an accessing system, wherein the throughput rate is associated with information related to the digital content stored as a file and the throughput rate is used as a parameter to delay a pre-processing operation.

In another embodiment, a method for utilizing digital content is provided. The method includes controlling a throughput rate for utilizing the digital content by an accessing system, wherein the throughput rate is associated with information related to the digital content stored as a file and the throughput rate is controlled by a storage system that is operationally coupled to the accessing system.

This brief summary has been provided so that the various embodiments disclosed herein may be understood quickly. A more complete understanding can be obtained by reference to the following detailed description of the various embodiments thereof in connection with the attached drawings.

BRIEF DESCRIPTION OF THE DRAWINGS

The foregoing features and other features will now be described with reference to the drawings of the various embodiments. In the drawings, the same components have the same reference numerals. The illustrated embodiments are intended to illustrate, but not to limit the invention. The drawings include the following Figures:

FIG. 2 shows a top-level block diagram of a Pre-Processing Module for controlling a Throughput Rate, according to one embodiment;

FIGS. 3 and 4 show process flow diagrams for applying delay to control a Throughput Rate, according to one embodiment;

DETAILED DESCRIPTION

Definitions

Figure 1A:
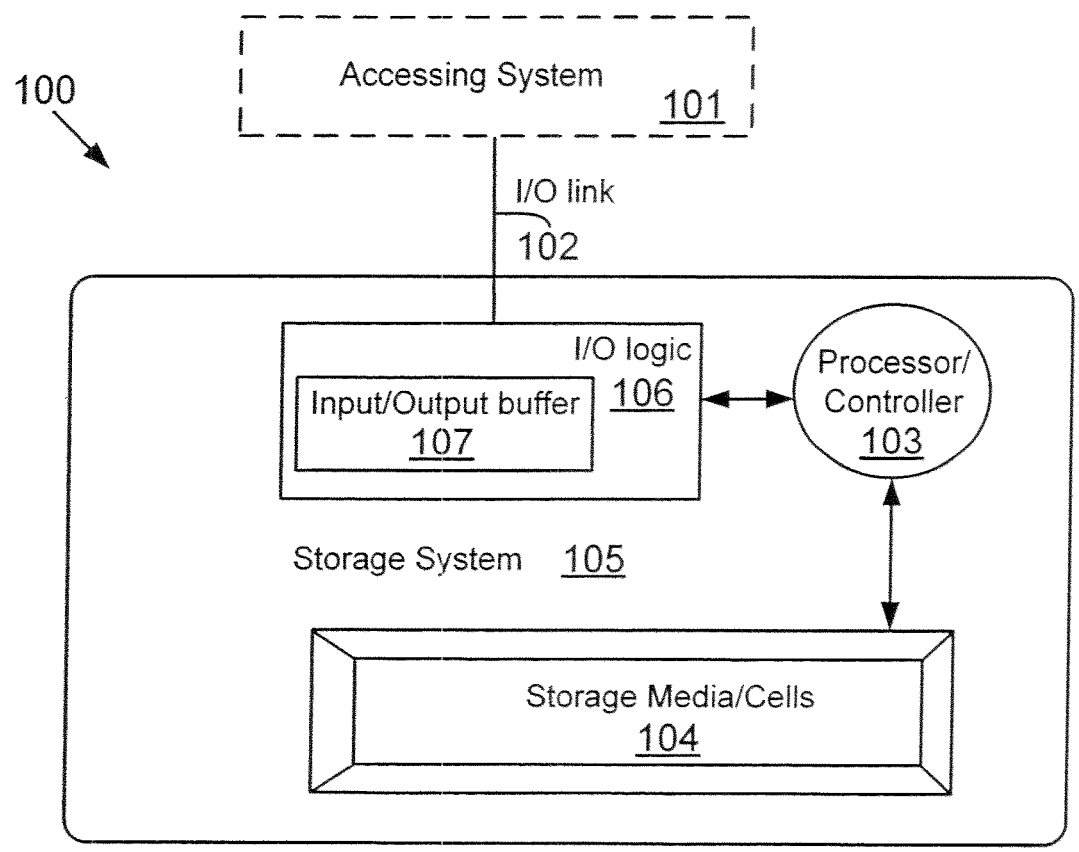
FIG. 1A shows a block diagram of an Accessing System coupled to a storage system, according to one embodiment.

The following definitions are provided as they are typically (but not exclusively) used in the computing environment, implementing the various embodiments disclosed herein.

"Accessing System" (may also be referred to as a Host System or a Requesting System) means a system that requests digital content that can be viewed, listened to, read, played, executed, or otherwise utilized by a user using an appropriate application or device. Accessing System includes desktop computers, laptop computers, tablet computers, personal digital assistants (PDAs), mobile phones, MP3 players, DVD players, gaming consoles, digital recording devices such as digital cameras, and others.

"Bit Rate" means the amount of data that needs to be Pre-Processed by an Accessing System in a given unit of time. The Bit Rate may depend on an encoding type, format of stored digital content, content type, or a combination thereof. The Bit Rate may be fixed or variable.

"Data Rate" means the speed (for example, the number of bytes per second) at which digital content is transferred from one location (for example, a storage system) to another location (for example, an Accessing System), at any given time.

"Pre-Processed" (or "Pre-Processing") means any operation for Utilizing digital content. Some examples of Pre-Processing include compressing and de-compressing operations performed by a CODEC module; decryption and encryption operations performed by a cryptographic module; accessing content before it is used; and others.

"Pre-Processing Module" means a module, component or unit (used interchangeably throughout this specification) that performs a Pre-Processing operation. The Pre-Processing Module may be implemented in hardware, software, or a combination thereof. Examples of a Pre-Processing Module include a DRM module, a CODEC module, a cryptographic module and others.

"Throughput Rate" means an average Data Rate within a time interval. The Throughput Rate may be set or established to limit how much data is Released to an Accessing System in a given time. The Throughput Rate can represent a maximum amount, average amount or a range of data that is Released to an Accessing System.

"Released" means when an Accessing System is given access to digital content for Utilizing the digital content. Released does not require actual data transfer from one location to another location.

"Utilizing" (or Utilized") means viewing, listening to, reading, playing, executing, or any other use of digital content, typically by an end user using an appropriate application or device. Typically, these operations are performed by an Accessing System.

The following provides an example of the foregoing defined terms. A user using a laptop computer (Accessing System) may want to play (Utilize) an audio/video file (digital content). The laptop computer may use a software application (for example, WINDOWS MEDIA PLAYER software application available from MICROSOFT Corporation) to play the audio/video file. The laptop computer Pre-Processes the digital content at a certain rate (Bit Rate) to properly play the audio/video file. Before the digital content is Released to the laptop computer; a cryptographic module (Pre-Processing Module) may decrypt (Pre-Process) the audio/video file.

In one embodiment, a Throughput Rate controls the rate at which digital content is made available (Released) to an application. The Throughput Rate may be implemented at an input/output (I/O) level (i.e. implemented by a storage system) or by a Pre-Processing Module. In one embodiment, the Throughput Rate may be applied in a plurality of ways, for example, by using specific commands, a DRM content license, access parameters (for example, login credentials and security keys (for example, cipher keys)) and others, as described below.

In one embodiment, a storage system controls the rate at which a data stream is Released to an Accessing System. The Throughput Rate defines the rate at which data may be Released to the Accessing System in a given time interval. The storage system notifies the Accessing System when data is available or unavailable and hence effectively controls how much data can be Utilized in a given time.

In another embodiment, the Throughput Rate depends on at least one parameter that relates to digital content. For example, the Throughput Rate may depend on the Bit Rate. If the Bit Rate is variable, then an average Bit Rate value may be used to set the Throughput Rate. The Throughput Rate may be equal to or higher than the Bit Rate.

The Throughput Rate sets an ideal maximum speed at which data is Utilized by the Accessing System. Thus, making an illegal copy would take about as long as it takes to play (i.e. Utilize) an audio/video file with almost the same inconvenience, for example, in recording an audio/video file. Hence, controlling the Throughput Rate may deter digital content piracy.

SYSTEM LEVEL EXAMPLES

FIG. 1A shows a top-level block diagram of a generic system 100 where a storage system 105 controls the Throughput Rate, according to one embodiment. The Throughput Rate may be determined or received by storage system 105, as described below.

System 100 includes an Accessing System 101 operationally coupled to storage system 105 via an I/O link 102. Accessing system 101 typically includes several functional components. These components may include a processor (may also be referred to as a central processing unit (CPU)), main memory, I/O devices and others. The main memory is coupled to the CPU via a system bus or a local memory bus. The main memory is used to provide the CPU access to data and program information at execution time. Typically, the main memory is composed of random access memory (RAM) circuits. A computer system with the CPU and main memory is often referred to as a Host System.

Storage system 105 includes a memory controller 103 that interfaces with I/O logic 106 to transfer digital content to and from storage media (or cells) 104. I/O logic 106 may include an I/O memory buffer 107 where data is temporarily stored (or "buffered") before being transferred to and from Accessing System 101.

In one embodiment, data is stored in I/O buffer 107 for a certain duration (i.e. a delay is added) to reach a target Throughput Rate. The target Throughput Rate may depend on a type of Accessing System, type of digital content, intended use of digital content, and a combination thereof. The duration may be longer than the period when data is held in an environment where the Throughput Rate is uncontrolled. Data is held long enough in I/O buffer 107 to meet the target Throughput Rate. The duration (i.e. after a delay is added) is such that a minimum Data Rate based on Accessing System 101 specifications is maintained to minimize any interruption in data availability to Accessing System 101 due to time out or any other problems. If Accessing System 101 does not have access to data beyond a certain duration then an application running on Accessing System 101 may declare a timeout, which may disrupt an operation. For example, when an Accessing System 101 is playing an audio file but it does not have enough data to play for certain duration (programmable), then the application may declare a timeout and abandon the operation, or interrupt the playback operation to buffer data.

Controller 103 is aware of buffer 107 size and can keep track of time. Based on buffer 107 size and tracked time, Controller 103 refreshes buffer 107 to meet the target Throughput Rate and hence, avoids timeout problems. Data is released from I/O buffer 107 in a time-controlled manner to reach the target Throughput Rate.

A delay introduced to control the Throughput Rate may be based on an internal clock speed for storage system 105, which helps determine the number of cycles storage system 105 has to wait to reach the target Throughput Rate. The delay itself may be a variable value.

The various embodiments disclosed herein complement existing DRM systems by providing another barrier to prevent digital content piracy. Because time is typically of the essence, a Throughput Rate controlled by a storage system (or a Pre-Processing Module) may discourage a would-be pirate by preventing access to digital content at a rate higher than a rate specified for a digital content file. For example, even if storage system 105 is capable of transferring data at a higher rate, for example, at approximately 20 megabytes per second, the storage system controls the Throughput Rate, for example, to a slower average rate of 128 kb/s, instead of 20 megabytes per second. Hence, 1 GB of audio data may take about 10 hours to process using the controlled Throughput Rate, according to one embodiment. Without the using controlled Throughput Rate, it may only take about 50 seconds to access the 1 GB audio data.

In one embodiment, different types of storage systems (as described below with respect to FIG. 1B) may be used to control the Throughput Rate. For example, storage system 105 includes without limitation, non-volatile memory devices (includes Smart Cards, SIM cards), hard disks, and others, including any storage system that can be accessed via a state machine.

Different connection protocols (proprietary or standard) may be used to operationally couple storage system 105 to Accessing System 101, for example, universal serial bus (USB), SCSI; Bluetooth; Contactless, wireless and others. The adaptive aspects disclosed herein do not depend on any specific protocol or standard.

Storage system 105 may also use a special status signal or command to notify Accessing System 101 to continue to wait for content as described below. This reduces any timeout problems that may disrupt user experience in Utilizing digital content.

Figure 1B:
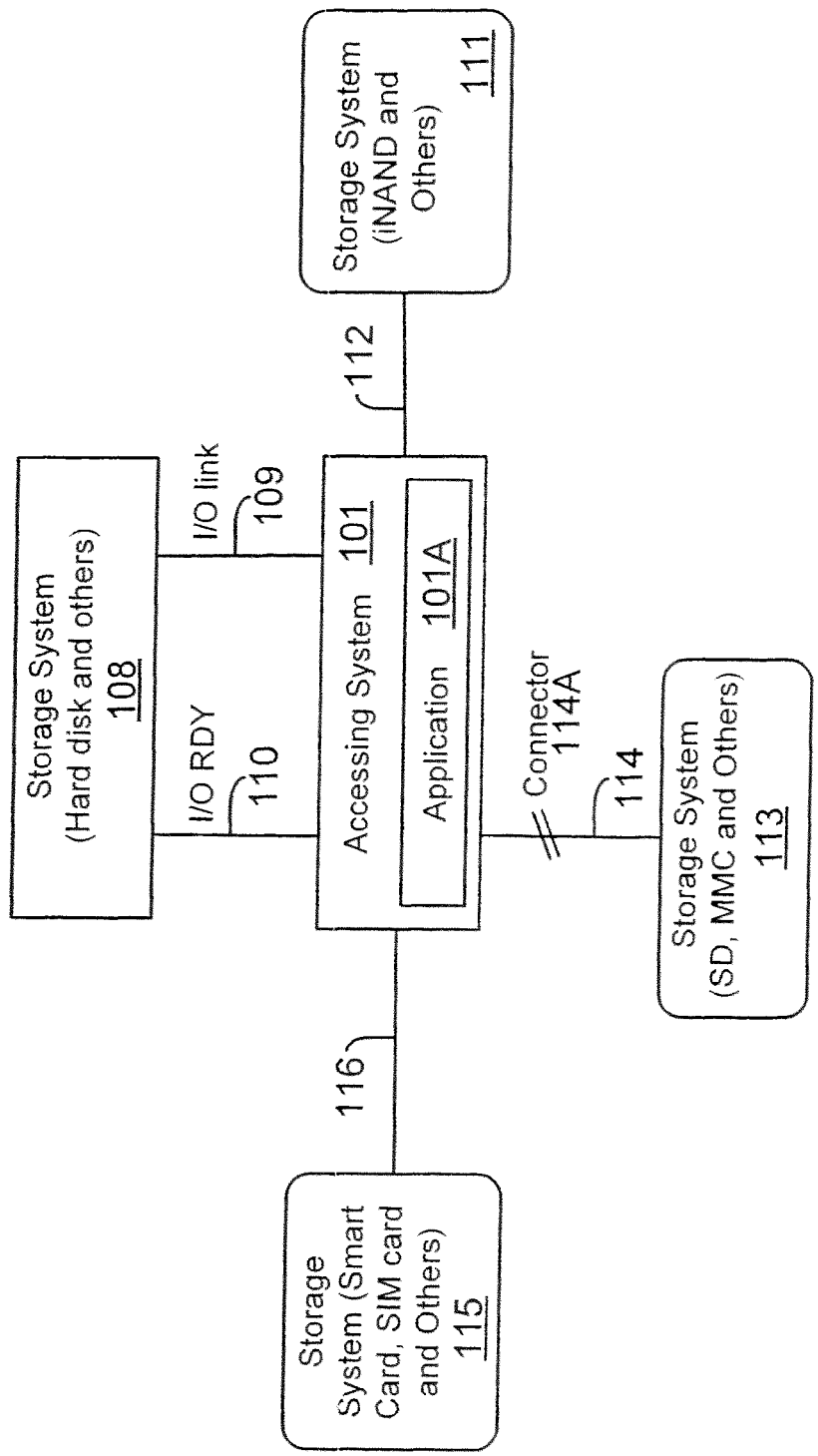
FIG. 1B shows examples of different types of storage systems used with an Accessing System, according to one embodiment.

FIG. 1B shows examples of different types of storage systems 108, 111, 113 and 115 that can interface with Accessing System 101. Application 101A running on Accessing System 101 Utilizes digital content that is stored in any one of the storage systems. Application 101A will depend on the type of digital content and its intended use. One example, of Application 101A is the WINDOWS MEDIA PLAYER application to play audio/video content.

Storage system 108 may be a hard disk that sends and receives data via I/O link 109 and uses a dedicated link 110 (shown as I/O RDY 110) for sending and receiving commands. Storage system 108 uses link 110 to notify Accessing System 101 of a "Busy State". The Busy State indicates to Accessing System 101 that storage system 108 is not ready to receive a new command, or to send or receive data.

Storage system 111 may be a non-removable, non-volatile memory system, for example, an iNAND based memory system. Storage system 111 uses I/O link 112 to notify Accessing System 101 of a Busy State and for I/O operations (for example, sending and receiving data).

Storage system 113 may be a removable, non-volatile memory device and is operationally coupled to Accessing System 101 via connector 114A. Storage system 113 uses I/O link 114 for I/O operations and for notifying Accessing System 101 of a Busy State. Storage system 113 may be based on Secure Digital (SD), Multi-Media Card (MMC) or any other non-volatile memory standards.

There are currently many different types of non-volatile memory cards that are commercially available, examples being the CompactFlash (CF), the MMC, SD, miniSD, Memory Stick, SmartMedia and TransFlash cards. Although each of these cards has a unique mechanical interface, electrical interface or mechanical and electrical interface or any other interface (including a wireless interface), according to its standardized specifications, the flash memory included in each may be very similar. These cards are all available from SANDISK Corporation, assignee of the present application.

SANDISK Corporation also provides a line of flash drives under its Cruzer trademark, which are hand held memory systems in small packages that have a Universal Serial Bus (USB) plug for connecting with a Host System by plugging into the Host System's USB receptacle (for example, 114A). Each of these memory cards and flash drives include memory controllers (103) that interface with the Accessing System 101 and control operation of the flash memory within them.

Storage system 115 includes Smart Cards, SIM cards and other types of non-volatile memory systems. A Smart Card is an integrated circuit with electronic memory and is used for a variety of purposes, for example, storing medical records, generating network identifiers and others. A SIM card is a type of Smart Card that may be used in cellular phones for example, for storing information and encrypting voice and data transmissions.

Storage system 115 uses an I/O link 116 for I/O operations and for notifying Accessing System 101 of a Busy State using status commands. For example, a Smartcard can use the standard "SW1" and "SW2" status bytes to notify Accessing System 101 when data is not ready and when data is ready. Furthermore after a defined status, Accessing System 101 may send another command such as a "GetResponse" command to storage system 115 and determine the time it has to wait. If Accessing System 101 requests data earlier than planned, then a status message may be used to notify Accessing System 101 that the data is still not ready and it has to wait.

Collectively and interchangeably, the processes and mechanisms for notifying the Accessing System 101 of a Busy State may be referred to as a "busy flag". In conventional systems, the busy flag is sent to an Accessing System based on storage system 105 capabilities to process an I/O operation, for example, when a storage system itself is not ready to send or receive data. In one embodiment, the busy flag is sent to control the Throughput Rate even though at any given time the storage system may be capable of sending or receiving data.

Figure 1C:
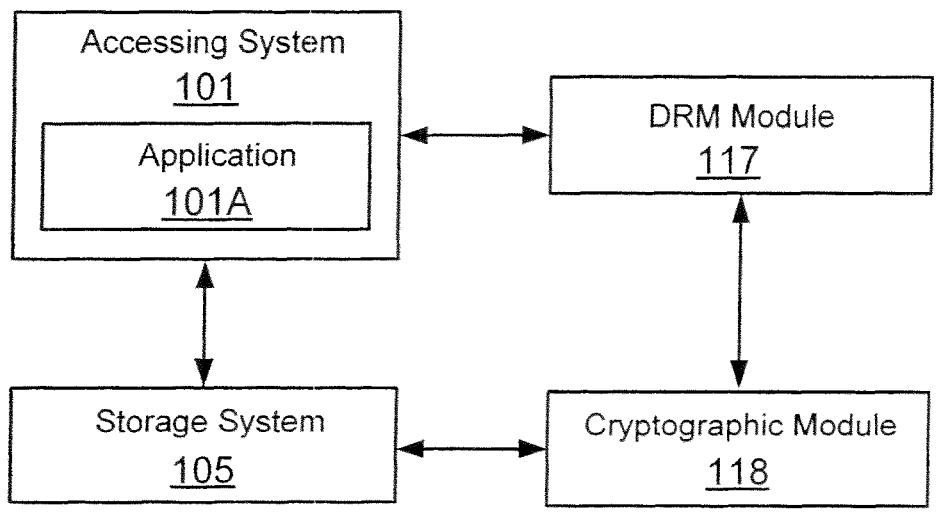
FIG. 1C shows a block diagram of a system using a DRM Module, according to one embodiment.

As discussed above, a DRM Module is used to control access to digital content. FIG. 1C shows an example of a DRM Module 117 that verifies if a user using Accessing System 101 has the appropriate permissions to access certain digital content. DRM Module 117 may be implemented in hardware, software, or a combination thereof. Also shown is a Cryptographic Module 118 that performs certain cryptographic functions after DRM Module 117 has verified the permissions. Cryptographic Module 118 may be a standalone module, a sub-system of DRM Module 117 or a sub-system of storage system 105. In one embodiment, as described below, DRM Module 117 provides decryption keys and a Throughput Rate to cryptographic module 118 to delay cryptographic functions.

Determining Delay to Control the Throughput Rate:

The following provides an example of how a delay may be determined to control the Throughput Rate for a file of size C. For this example, S may be the speed (for example, in bytes/second) at which data is transferred between storage system 105 and Accessing System 101; B is the size of I/O buffer 107 (FIG. 1A) and the expected (or desirable) Throughput rate is designated as T. The delay to access the file may be represented by Dc, where:

$$D_c = C \times \frac{(S-T)}{S \times T}$$

In one embodiment, the file may be segmented into "n" number of chunks (or segments) and after each chunk, a delay of $$\frac{(D_c)}{n}$$

may be added. Each chunk may be sized according to the size of I/O buffer 107. When processing ends (for example, at the end of playing an audio file) the actual Throughput Rate is similar to an expected Throughput Rate. This mechanism may be used in a system where either the file size is provided to the storage system or the storage system is aware of the file size.

In another embodiment, a delay may be added between I/O buffer 107 access operations. This embodiment is useful when a file size is not known to a storage system, (for example, storage system 113). When file processing ends (for example, at the end of playing an audio file) the actual Throughput Rate is similar to the expected Throughput Rate. The delay is intended to control the Throughput Rate and may be designated as $D_b$, where:

$$D_b = B \times \frac{(S-T)}{S \times T}$$

In another embodiment, the delay may be added between certain time windows (or intervals) to control the Throughput Rate. For example, if an average time window (tw) is 1 second, then a delay, $$D_{tw=1sec} = 1 - \frac{T}{S}$$

is applied after each second of data access.

Figure 1D:
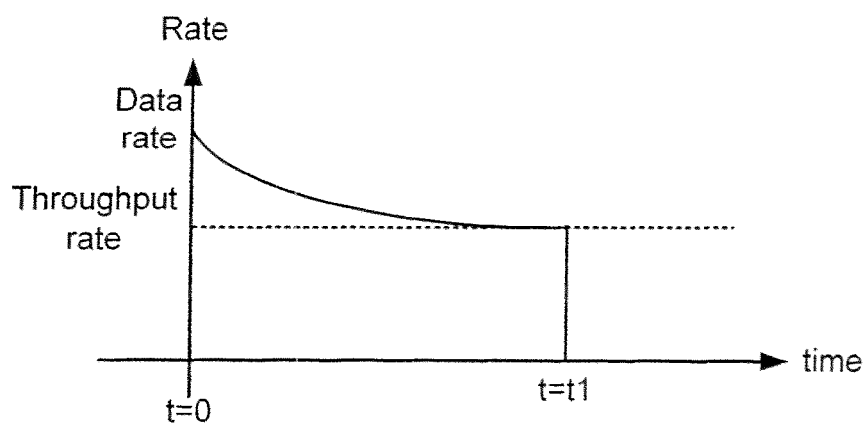
FIG. 1D graphically illustrates controlling a Throughput Rate, according to one embodiment.

FIG. 1D graphically illustrates how variable delay may be applied over time while a file is being processed (Utilized). In this example, the file is accessed at t=0 and the processing ends at t=t1. Variable delay allows one to reach a target Throughput Rate without affecting user experience. Accessing System 101 may be provided immediate access to some digital content (for example, 1% of a digital file) by applying a short delay (or no delay) at the beginning (i.e. at t=0). Thereafter, longer delays are applied gradually (i.e. between t=0 and t=t1) to reach a target Throughput Rate. This allows Accessing System 101 to buffer data fast enough so it can start processing content. This optimizes overall processing time, while a pirate is not able to access the file too quickly.

It is noteworthy that the foregoing techniques and other techniques described below do not require a storage system to know a file system structure details. The file system is used to store digital content.

Throughput Rate Control by Pre-Processing Module:

In another embodiment, the Throughput Rate may be controlled by a Pre-Processing Module. The Pre-Processing Module may be used to control access to protected digital content, assist in processing digital content, or a combination thereof. In this embodiment, the storage system may wait for the Pre-Processing Module to output data before Releasing the digital content.

FIG. 2 shows an example of a Pre-Processing Module 200 that receives input data 201, Pre-Processes input data 201 and then outputs data 202. Input data 201 may be protected, compressed, unprotected or decompressed digital content. Pre-Processing Module 200 may be implemented in hardware, software, or a combination thereof.

Pre-Processing Module 200 includes without limitation a CODEC module, a DRM Module (117, FIG. 1C), a cryptographic module (118, FIG. 1C), and others. A CODEC module is typically used to compress and decompress audio, video and audio/video files. A DRM Module is typically used to verify if a device, application, user or a combination thereof, has proper permissions to access digital content for certain functions, for example, to play, move or copy a file. A cryptographic module typically performs security related process steps for example, encrypting and decrypting data.

In one example, a cryptographic module may add delay during cryptographic calculations or after performing cryptographic calculations. After the cryptographic module receives input data 201 (or a portion of input data 201), instead of returning the result immediately, the cryptographic module holds the data to reach an expected Throughput Rate. Hence, the Throughput Rate effectively controls the Pre-Processing rate.

FIG. 3 shows a top-level process flow diagram for adding delay by Pre-Processing Module 200 after data has been Pre-Processed, according to one embodiment. The process starts in step S300 and in step S301, input data 201 is received or acquired by Pre-Processing Module 200. In step S303, the Throughput Rate for the input data is received or acquired by Pre-Processing Module 200, as described below.

In step S303, the data is Pre-Processed. The Pre-Processing operations depend on the function of the Pre-Processing Module 200. For example, when a cryptographic module is the Pre-Processing Module, then the cryptographic functions are performed in step S303.

In step S304, a delay is added before output data 202 is Released in step S305. As discussed above, the amount of delay is based on an expected Throughput Rate.

FIG. 4 shows an example for controlling the Throughput Rate by adding delay between Pre-Processing operations, according to one embodiment. The process starts in step S400 and in step S401, input data 201 is received or acquired by Pre-Processing Module 200. In step S402, the Throughput Rate for the input data is received or acquired by Pre-Processing Module 200 as described below.

In step S403, the input data is partially Pre-Processed. For example, for a cryptographic module, the cryptographic functions are partially performed. In step S404, a delay is added. Steps S405 and S406 are similar to steps S403 and S404, respectively. The total delay is based on an expected Throughput Rate and the data Pre-Processing is completed with the appropriate delay. Thereafter, the Pre-Processed data is output in step S407.

Figure 5:
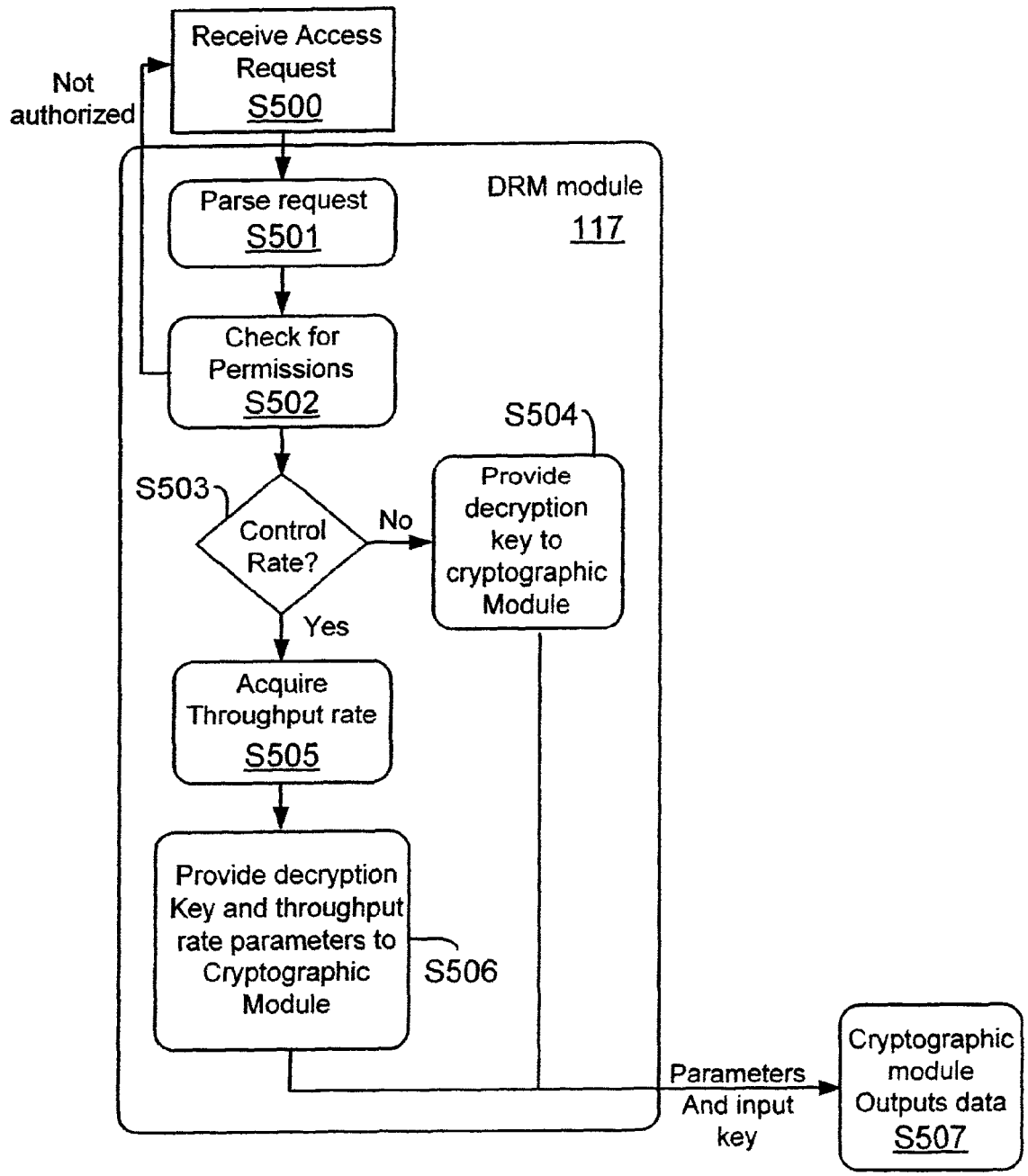
FIG. 5 shows a process flow diagram for a DRM module controlling a Throughput Rate, according to one embodiment.

In one embodiment, the Throughput Rate may be controlled by a DRM Module (117, FIG. 1C). The Throughput Rate may vary with the type of access or use, as described below. FIG. 5 shows an example of a process flow diagram where DRM Module 117 controls the Throughput Rate. The process starts in step S500, when DRM Module 117 receives a request for digital content and for performing a certain operation, for example, to play an audio file. A user using Accessing System 101 may request to play an audio file via application 101A.

In step S501, DRM Module 117 parses the request. Step S501 may depend on the type of operation, application and the type of request.

In step S502, DRM Module 117 verifies if the user has the appropriate permissions to access the requested content or to perform the requested operation. If the proper permissions are not available, then the request is denied and DRM Module 117 waits for the next request.

If permissions are available in step S503, then DRM Module 117 determines if the Throughput Rate needs to be controlled. This could be indicated by a special command, by setting a field in the request or in any other manner. If the Throughput Rate does not need to be controlled, then in step S504, DRM Module 117 provides a decryption key to cryptographic module 118 and the process moves to step S507, described below.

If the Throughput Rate needs to be controlled, then in step S505, DRM Module 117 acquires the Throughput Rate, as described below. Thereafter, in step S506, a decryption key and the Throughput Rate is provided to cryptographic module 118.

In step S507, cryptographic module 118 controls the Throughput Rate, as described above with respect to FIGS. 3 and 4.

Determining/Receiving the Throughput Rate:

The Throughput Rate may be determined or received in a plurality of ways, for example, by using specific commands, in a DRM based content license, from content Bit-Rate and others. The Throughput Rate may be determined when digital content is created and may be based on the format or encoding type, or a combination thereof. The various embodiments disclosed herein are not limited to any particular method for determining or receiving the Throughput Rate. The following provides some examples for determining or receiving the Throughput Rate:

(a) A storage system may be given some information (for example, by an Accessing System) regarding a file or provided with a direct or indirect reference to the file that is being accessed. A direct reference is a file name. An indirect reference may be a key identifier used by a storage system (for example, 113, FIG. 1B) to identify a cipher key for protected content. The Throughput Rate may be directly or indirectly associated with the information, the reference or a combination thereof. The storage system processor (103, FIG. 1A) uses the reference or the information to acquire (or determine) the Throughput Rate.

(b) When additional information (for example, file size) regarding a file is not provided to the storage system, then the end of a file transfer operation (i.e. when digital content is stored in a storage system) may be indicated by a command. This command may be sent by the Accessing System and may be used to provide the Throughput Rate to the storage system. In one embodiment, this approach may be implemented with some other security measure to prevent full speed access to stored content when such a command is not being used. For example, the storage system may be locked to operate at a low speed (for example, a low default speed); and then a higher speed may only be available after the command is received or used. In one embodiment, specific access parameters (or login credentials) may not be needed to access content at the lower speed.

(c) Some storage systems, for example, TrustedFlash based storage devices, are able to process content security keys (for example, cipher keys). The security keys are used to prevent unauthorized access to stored content. A security key may be associated with a single digital file and the Throughput rate may be linked to the use of the key. In this case when the key is loaded or created, a Throughput Rate may be associated with it by using the same command or an additional command that is used to load or create the key. Once a request to use the key is obtained then the adequate Throughput Rate is applied. Furthermore, storage systems based on TrustedFlash may use authentication to access security keys. The authentication may be based on verifying a user account. In this example, a Throughput Rate may be provided for each account or for each security key that is used to access content. When access is granted to an account, an additional parameter in an existing command or a new command may be used to provide the Throughput Rate. The Throughput Rate is then stored by the storage system for later use.

(d) Some storage systems may understand a file system structure and are able to determine when a file is being accessed. In this example, when a memory location is accessed, the storage system determines what file uses that location and performs a lookup to obtain a Throughput Rate, and thereafter, applies the associated Throughput Rate. These storage systems may also receive the Throughput Rate as described above.

(e) The Throughput Rate may be also stored in the storage system itself. For example, in systems that use security to protect content or that use DRM, a field associated with content may be used to store the Throughput Rate. This field may be in addition to other fields that are used to secure access to digital content. For other systems, i.e. unsecured and non-DRM systems, the Throughput Rate may be associated with any data that helps identify a file. In another embodiment, the storage system may have its own "database" or "table" that stores Throughput Rate as associated with specific files.

(f) Some storage systems (for example, Smart Cards, SIM cards and others) may also be able to parse digital content (i.e. a portion thereof and determine the Bit Rate information from the parsed digital content. The Bit Rate information may then be used as a parameter to set the Throughput Rate. In this case the Throughput Rate may be determined from the content itself and the Accessing System does not need to provide the Throughput Rate.

(g) Intelligent storage systems, for example, Smart Cards and SIM cards may add a field to their own internal security database to store the Throughput Rate. The security database is used by these devices to store information to prevent unauthorized access. The Throughput Rate may be determined only once, for example, at first access and is then stored for later use.

(h) In another embodiment, the Throughput Rate may be associated with access parameters, for example, login credentials. The access parameters allow a user to access digital content at the associated Throughput Rate. The Throughput Rate may be included as data in a digital certificate, for example, a certificate extension; part of a credential name, for example, some predefined part of a login name, or part of a credential value. Furthermore, the Throughput Rate may be determined by using the login credentials as a parameter. The credentials are processed with some pre-determined functions to get the Throughput Rate to apply. The credentials are then used for getting access to content and setting up the Throughput Rate. For example, a user identifier and password (access parameters) may be used to view content at a specified Throughput Rate, while higher authentication (for example, a PKI digital certificate used as an access parameter) is used to copy content at a different Throughput Rate.

Figure 6:
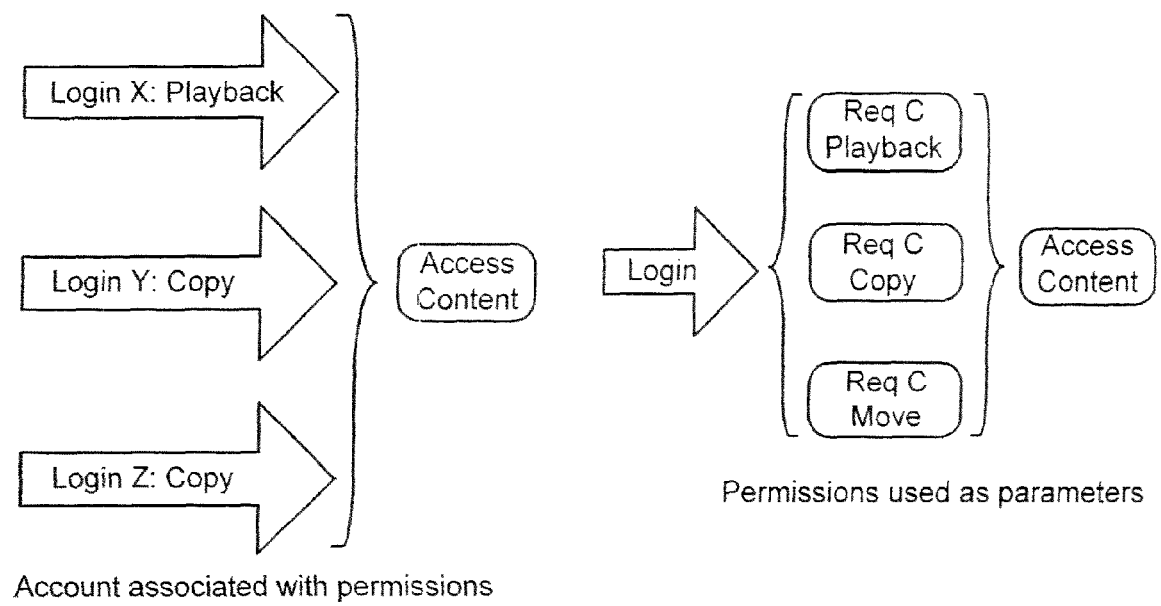
FIG. 6 shows an example of associating different Throughput Rates to different login accounts, according to one embodiment.

(i) The Throughput Rate may be included with individual DRM permissions. The Throughput Rate may be delivered with a DRM content license. The Throughput Rate may vary depending on the type of request. For example, the Throughput Rate may be different for copying, moving or for digital content playback. Most storage systems only know read and write operations and are unaware of why content is being accessed. In one embodiment, the purpose of content access is specified when implementing DRM. The request type may be identified by using specific commands, a parameter in a command, using specific accounts or any other method. Separate predefined accounts may also be used to indicate the type of access, for example, play, copy and others. In this case, login with an account may be used to define the purpose for getting data. FIG. 6 illustrates use of separate login credentials to access content for different functions, for example, playback, copy and move. Login X is used to playback content at a certain Bit Rate X1. Login Y is used to copy content at Bit Rate Y1. Login Z is used to move content at Bit Rate Z1. Bit-rates X1, Y1 and Z1 may be different from each other, regardless of the number of login accounts. In another embodiment, only one account, for example Login X account, may exist to prevent any high speed access for illegal copying.

(j) In another embodiment, a naming schema may be used to identify operations and then a Throughput Rate is applied for the operation. For example, accounts may be named in a way that allows the storage system to recognize the type of access and determine the purpose of getting the data. A naming convention for access parameters (or login credentials) may be used where a portion after a specific character may denote the type of access, the Throughput Rate to apply, and a combination thereof. Another option would be to set attributes related to permissions within an account. The attributes may be set when the account is created and the Throughput Rate is based on the attributes. Once the storage system is aware of the type of access, it uses the appropriate Throughput Rate.

The following provides an example of a naming schema, according to one embodiment. Access parameters for digital content may be divided into different parts, for example, the access parameters may include a unique identifier (ID) and an encoded throughput rate value. The unique ID may include code to specify or indicate a requested action.

The throughput rate may be encoded using standard encoding techniques techniques. For example, 128 kb/s may be represented as 001010100 that may be represented as 84 decimal where: 1=>001, 2=>010 and 8=>100.

The unique ID may include bits that may be used to indicate permissions for different types of operations. For example, 3 bits 010 may be used to indicate a "play" operation and 100 may indicate a copy operation.

The unique ID may also be coded to indicate how many times an operation is allowed. For example 8 bits may provide 256 different codes that may be assigned to a specific permission for a given operation. For example a value of "00000000" may be assigned to play an audio file once.

Based on the foregoing, 10000000 may be used as a unique ID and 128 kb/s may be represented with this unique ID as:
   10000000 010 001 010100 i.e. 525396 in hexadecimals Therefore, 10000000 010 001 010100 when used as a login account, login credential or a combination thereof, tells a storage system that 128 kb/s may be used for playback.

Applying the Throughput Rate:

The Throughput Rate may be applied in a plurality of ways based on the application and how the Throughput Rate was determined or received. The following provides some examples of how the Throughput Rate may be applied:

(a) Where the Throughput Rate is implemented using a DRM license, then it may be applied by the DRM Module (or a cryptographic module) by using a delay, as described above. In another embodiment, it may be applied at the storage system level by controlling I/O buffer access, also described above.

(b) If the Throughput Rate is associated with access parameters (for example, login credentials), then the Throughput Rate may be applied when a login account associated with the Throughput Rate is accessed.

(c) When the Throughput Rate is associated with a login account and use of a security key (for example, a cipher key, a content license and others) then the Throughput Rate is applied when the account is used to access specific content protected by the security key.

Figure 7:
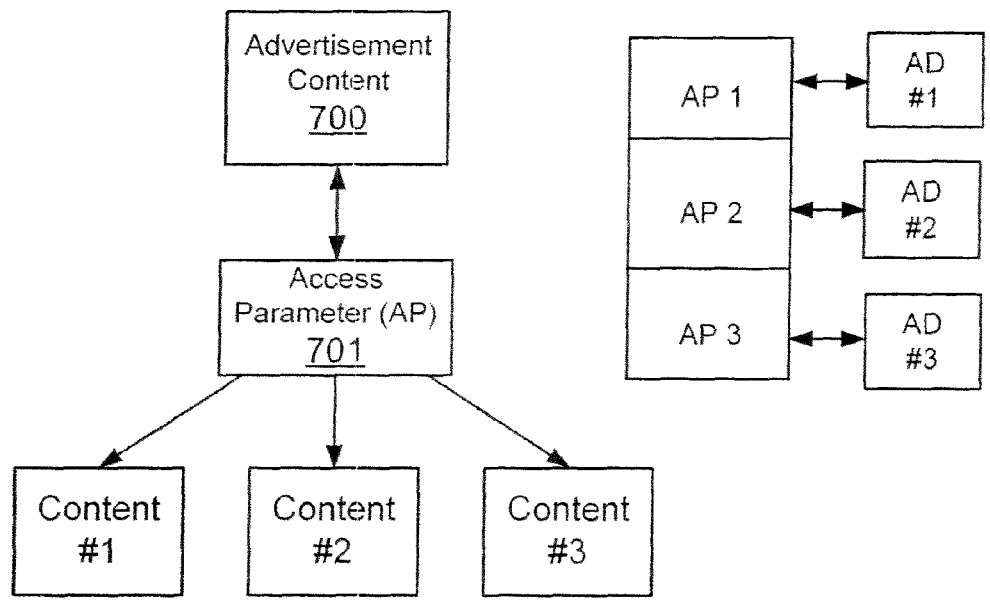
FIG. 7 shows an example of controlling display of advertisement content, according to one embodiment.

Controlling Display of Advertising Content:

In one embodiment, the Throughput Rate may be used to control how digital advertisements (may be referred to as "advertisements") are displayed to a user using Accessing System 101 (FIG. 1A), before a user is allowed access to other digital content. FIG. 7 shows an example of associating digital advertisement(s) 700 with various digital content files (shown as Content 1, Content 2 and Content 3). A Throughput Rate is associated with advertisement 700. Advertisement 700 is displayed to a user at the associated Throughput Rate before a user can Utilize Content 1, 2, and 3.

Access parameter 701 is associated with advertisement 700 and may be used to control access to Content 1, 2 and 3. In one embodiment, access parameter 701 is defined by a hashing function for advertisement content 700. In another embodiment, access parameter 701 may include at least one login account or a key identifier, which may be used to gain access to one or more of Content 1, 2 and 3. Access parameter 701 is protected by a hash function for advertisement 700 so that advertisement 700 is displayed in full at a controlled Throughput Rate before other content (for example, Content 1, 2 or 3) can be accessed. Different access parameters (shown as AP 1, AP 2 and AP 3) maybe associated with different advertisement content (shown as AD #1, AD#2 and Ad#3).

The foregoing embodiments are illustrative only and not limiting. Many other applications and embodiments of the present invention will be apparent in light of this disclosure and the following claims.

What is claimed is:

1. A method for controlling access to digital content, comprising:
in a storage system with digital content, the digital content stored as a file, performing:
controlling a throughput rate associated with access to the digital content in the storage system, wherein while the storage system is operationally coupled to an accessing system, the digital content is retrievable by the accessing system at a transmission rate according to the throughput rate, and wherein the throughput rate depends on a bit rate of retrieval of the digital content by the accessing system; and
performing a cryptographic operation on the digital content by:
partially performing a cryptographic function on the digital content;
interrupting the cryptographic function by adding a first delay to the cryptographic operation; and
resuming the cryptographic function,
wherein the cryptographic operation reduces the throughput rate.

2. The method of claim 1, wherein the throughput rate is included with a digital rights management (DRM) permission in a content license and the content license is used to control access to the digital content.

3. The method of claim 2, wherein the content license includes a plurality of throughput rates for different operations that are used for accessing the digital content.

4. The method of claim 1, wherein the throughput rate is associated with a cipher key that is used to pre-process the digital content.

5. The method of claim 1, wherein the bit rate is related to an encoding type used to encode the digital content.

6. The method of claim 1, wherein the bit rate is related to a format of stored digital content.

7. The method of claim 1, wherein the bit rate is related to a content type of the digital content.

8. The method of claim 1, wherein the information is a naming schema that indicates an operation for utilizing the digital content and the throughput rate is associated with the operation.

9. The method of claim 1, wherein the storage system adjusts the transmission rate at which the digital content is transmitted to reach a rate not to exceed the throughput rate.

10. The method of claim 1, further comprising controlling transmission of the digital content at a first rate until receipt of a command allowing transmission of the digital content at a second rate.

11. The method of claim 1, further comprising:
parsing the digital content;
determining the bit rate from the parsed digital content; and
using the bit rate to set the throughput rate.

12. The method of claim 1, wherein the information comprises a security key, and wherein the storage system obtains the throughput rate by a command that is used to load or create the security key.

13. The method of claim 1, wherein an average bit rate value is used to set the throughput rate.

14. The method of claim 1, wherein the throughput rate is equal to the bit rate.

15. The method of claim 1, wherein the throughput rate is greater than the bit rate.

16. The method of claim 1, further comprising interrupting the resumed cryptographic operation and adding a second delay to the cryptographic operation.

17. A storage system, comprising:
a hardware interface to an accessing system; and
a memory controller configured to control a throughput rate of digital content to be sent to the accessing system via the interface while the storage system is operationally coupled to the accessing system,
wherein the throughput rate depends on a bit rate of retrieval of the digital content by the accessing system, and wherein the throughput rate is reduced during a cryptographic operation by:
partially performing a cryptographic function on the digital content;
interrupting the cryptographic function by adding a first delay to the cryptographic operation; and
resuming the cryptographic function.

18. The storage system of claim 17, wherein the memory controller is further configured to:
parse the digital content;
determine the bit rate from the parsed digital content; and
use the bit rate to set the throughput rate.

19. The storage system of claim 17, wherein the controller is further configured to adjust a data rate at which the digital content is transmitted to reach a rate not to exceed the throughput rate.

20. The storage system of claim 17, wherein the controller is further configured to control transmission of the digital content at a first rate until receipt of a command allowing transmission of the digital content at a second rate.

* * * * *